(12) United States Patent
Schon et al.

(10) Patent No.: US 11,126,324 B2
(45) Date of Patent: Sep. 21, 2021

(54) TILE INTERFACE AND LAUNCHPAD SYSTEM

(71) Applicant: SAP SE, Walldorf (DE)

(72) Inventors: Jamila Schon, Heidelberg (DE); Michael Krenkler, Wiesloch (DE); Eran Lahav, Kibbutz Dvir (IL); Marc Kumar Ziegler, Mauer (DE)

(73) Assignee: SAP SE, Walldorf (DE)

( * ) Notice: Subject to any disclaimer, the term of this patent is extended or adjusted under 35 U.S.C. 154(b) by 113 days.

(21) Appl. No.: 15/416,582

(22) Filed: Jan. 26, 2017

(65) Prior Publication Data
US 2018/0210615 A1    Jul. 26, 2018

(51) Int. Cl.
| G06F 9/451 | (2018.01) |
| G06F 3/0482 | (2013.01) |
| G06F 3/0486 | (2013.01) |
| G06F 40/134 | (2020.01) |

(52) U.S. Cl.
CPC .......... *G06F 3/0482* (2013.01); *G06F 3/0486* (2013.01); *G06F 9/451* (2018.02); *G06F 40/134* (2020.01); *G06F 2203/04803* (2013.01)

(58) Field of Classification Search
CPC ....... G06F 3/0482; G06F 3/0486; G06F 9/451
See application file for complete search history.

(56) References Cited

U.S. PATENT DOCUMENTS

| 6,724,403 | B1* | 4/2004 | Santoro ................ 715/765 |
| 7,490,295 | B2* | 2/2009 | Chaudhri .............. G06F 3/0484 715/764 |
| 7,954,064 | B2* | 5/2011 | Forstall ............... G06F 3/04817 715/779 |
| 7,987,431 | B2* | 7/2011 | Santoro ................ G06F 3/0481 715/765 |
| 8,255,831 | B2* | 8/2012 | Araumi ............. G06F 17/30126 715/810 |
| 8,390,670 | B1* | 3/2013 | Gottlieb ................ H04N 7/15 348/14.12 |
| 9,274,684 | B2* | 3/2016 | Han ..................... G06F 3/0484 |
| 9,411,505 | B2* | 8/2016 | SanGiovanni .......... G06T 13/80 |
| 10,452,757 | B2* | 10/2019 | Pang ..................... H04W 4/18 |
| 10,775,971 | B2* | 9/2020 | Bernaudin ............ G06F 3/0486 |
| 2009/0198573 | A1* | 8/2009 | Fox ........................ A63F 13/10 705/14.5 |
| 2011/0227739 | A1* | 9/2011 | Gilham ............... G06F 19/3406 340/573.1 |

\* cited by examiner

*Primary Examiner* — Alvin H Tan
(74) *Attorney, Agent, or Firm* — Sterne, Kessler, Goldstein & Fox P.L.L.C.

(57) ABSTRACT

Disclosed herein are system, method, and computer program product embodiments for a tile interface and launch pad system. An embodiment operates by providing a user interface with a plurality of tiles. An indication is received to move a first tile from a first section of the user interface to a second section of the user interface. The first tile as displayed in the first section includes a first selection of information, and tiles of the second section include a section selection of information. The visual appearance of the first tile is modified, and the second selection of information is displayed in the first tile.

20 Claims, 6 Drawing Sheets

| Tile Type | Brief Description | Example |
|---|---|---|
| KPI | Measure/monitor key operating metrics. | US Profit Margin by Region -99.99 |
| Comparison Chart | Visual comparison between different values. | Comparative Annual Totals / Subtitle / Americas 104M / APAC 97M / EMEA 234M / APA 197.123M / Optional Footer |
| Bullet Chart | Comparing a single value to one or more target values. | Cumulative Totals Expenses 33.3 Mio 75 Mio EUR / Cumulative Totals Expenses 25.5 Mio 75 Mio EUR / Cumulative Totals Expenses 8 44.5 Mio 75 Mio EUR |
| Trend Chart | Accumulated totals over time. | Incoming Customer Complaints By Region 8 Mio 80 Mio June 1 June 30 EUR / Comparative Annual Totals Subtitle 120.34 Mio 600 Mio Feb 1 Dec 30 EUR |

310 — KPI
320 — Comparison Chart
330 — Bullet Chart
340 — Trend Chart

FIG. 3A

TILE INTERFACE AND LAUNCHPAD SYSTEM

BACKGROUND

Background

An efficient and well-designed user interface can be the difference between the success and failure of an application or system. A user interface may include display components that link to other applications or programs. However, as the number of applications and programs to which the user interface links grows, so too does the amount of information that is displayed on the user interface. This can often lead to cluttered and non-user friendly interfaces that degrade performance and efficiency.

BRIEF DESCRIPTION OF THE DRAWINGS

The accompanying drawings are incorporated herein and form a part of the specification.

FIGS. 3A and 3B are block diagrams of example tiles according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a tile interface and launch pad system.

Figure 1:
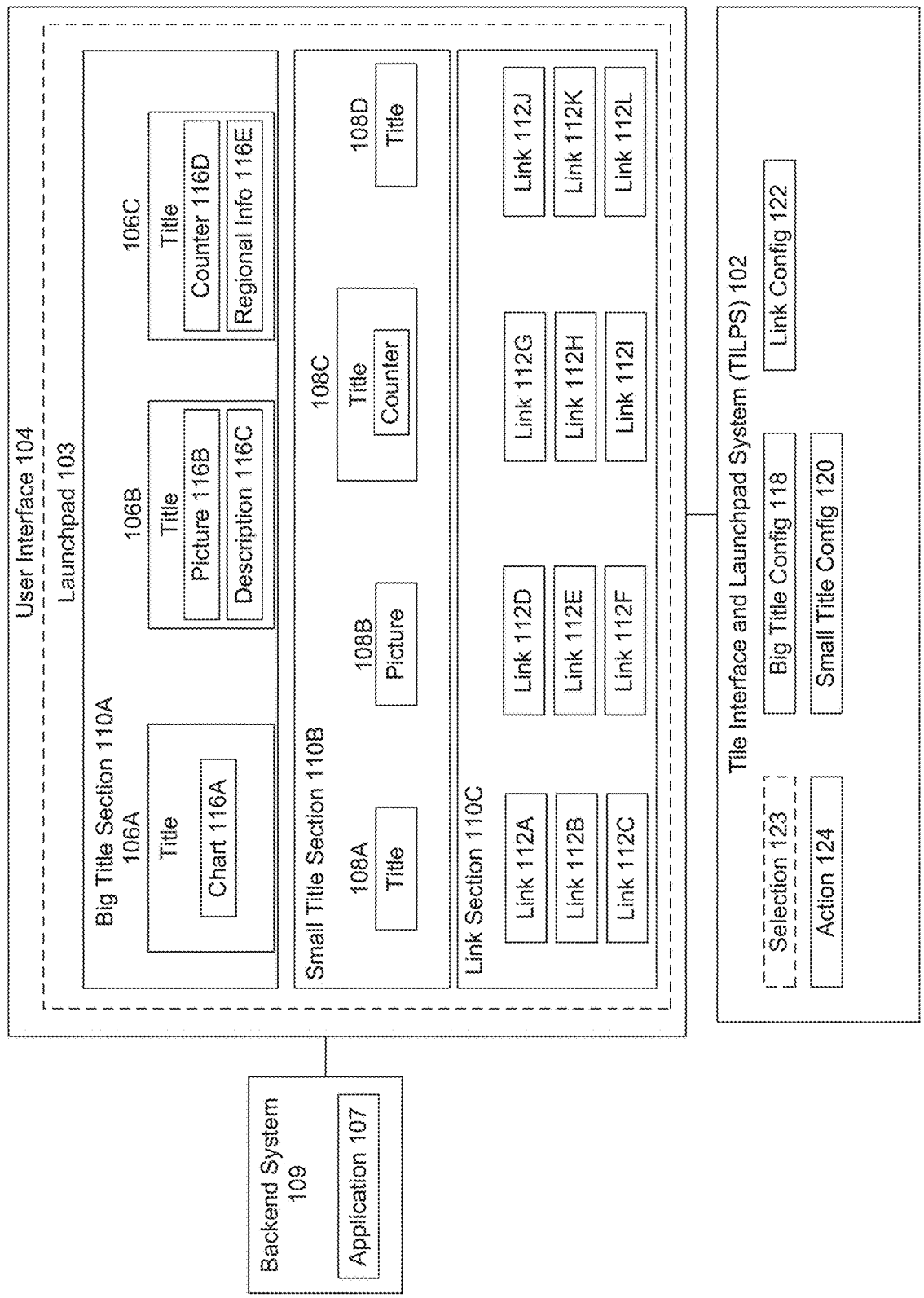
FIG. 1 is a block diagram of a tile interface and launch pad system (TILPS), according to some embodiments.

The display area of a user interface is valuable real estate. Too many items and/or too much information displayed in a user interface can clog the user interface and make it virtually unusable or inefficient for a user. Meanwhile too little information, or information irrelevant to a particular user, can waste valuable display space real estate. FIG. 1 is a block diagram 100 of a tile interface and launch pad system (TILPS) 102 that addresses these concerns and challenges, according to some embodiments.

TILPS 102 increases (or even maximizes) the display area of a user interface by varying the size of different display items. Also, TILPS 102 allows Launchpad 103 to be customized and configured on a per-user and/or per-device basis, which may be valuable because different users will often value different display items and information differently. TILPS 102 allows for flexibility in deciding which items are displayed on Launchpad 103, how much information about each item is displayed, where that information is displayed, and is configurable on a per-user and/or per-device basis. In an embodiment, TILPS 102 may use the settings or preferences of a particular user and provide comparable uniformity across different numbers of devices the user may use to access a system providing user interface 104, or across different users who may perform similar roles across an organization.

User interface 104 may correspond to a display area of a device. Different devices, such as mobile phones, laptops, touchpads, desktops, etc., may have different sized user interfaces 104. Within user interface 104, TILPS 102 may generate or provide Launchpad 103. Launchpad 103 may be a home screen that provides access to another system 109 or set of applications 107 to which a user has access. For example, Launchpad 103 may be the home screen for how employees of an organization log in and access different applications that are relevant to the employees performing their particular roles within the organization.

Launchpad 103 may be accessed by employees or other users across a variety of different devices, such as laptop computers, touch screen devices, mobile phones, etc. Different employees, particularly in different organizational roles, may access or be granted access to different applications or information they may use to perform their duties. TILPS 102 provides functionality that makes Launchpad 103 adaptable to meet the individual needs of the various users who may be accessing Launchpad 103 from different devices, maximizing the real estate of the display area of user interface 104 regardless from which device Launchpad 103 is being accessed while providing each user the most relevant information to that user.

Launchpad 103 may include various display elements. The various display elements or display items on Launchpad 103 may be big tiles 106 (or more generally first tiles 106), small tiles 108 (or more generally second tiles 108, where the second tiles 108 are smaller than the first tiles 106 in some embodiments), and links 112. Tiles 106, 108 may be containers or visual representations of an application 107 of a backend system 109 that is accessible via Launchpad 103. In an embodiment, a tile 106, 108 may be a visual representation that provides user-relevant information about a particular application 107 associated with the tile. For example, the information may include a name of the application, a summary of what the application is used for, and/or data retrieved from or accessed by the application, to name just a few examples. Then, for example, a user may select the tile 106, 108 to perform an action such as either updating or expanding on the data or launching the application 107.

Backend system 109 may be one more servers that host provide the functionality for one or more applications 107 represented by tiles 106, 108 and/or links 112. In an embodiment, backend system 109 may be remote from or wirelessly networked to a device operating user interface 104. In an embodiment, TILPs 102 may operate on a backend system 109 and provide relevant information to display Launchpad 103 on a mobile or other device with user interface 104.

Backend system 109 may include a database that provides data accessible to a user and/or application 107. In an embodiment, backend system 109 may provide functionality and resources enabling a user to launch or operate application 107. In different embodiments, a particular Launchpad 103 may serve as the gateway or interface to multiple backend systems 109, which may or may not directly or indirectly communicate with one another. For example, different applications 107 accessible from Launchpad 103 may be provided by different companies, creators, or organizations.

As noted above, in some embodiments, tiles 106, 108 may be visual containers that represent applications 107 operating across one or more backend systems 109. The different tiles 106, 108 may include information about or from the corresponding application(s) 107 that a particular user may find useful. Such information may include a name or title of the application, a state of the application or data on which the application executes, or other information. This information may be selectable or customizable on a per-user, per-user role, per-organization, and/or per-device (e.g., user interface 104 size) basis. In an embodiment, each tile 106, 108 may represent a single application 107, or a particular application 107 may be represented by multiple tiles 106, 108, where each tile provides access to different functionality or data of or associated with the application 107.

Which information is displayed and how that information is displayed via tiles 106, 108 may vary based on what is relevant to a particular user or a user in a particular role or performing a particular task. For example, a particular back system 109 may include hundreds or even thousands of applications 107 or functions. However, not all of the applications 107 may be relevant to each user. For example, different users may not be able to access all the applications 107 based on their roles within an organization or clearance level. In an embodiment, TILPs 102 may determine a role of a user and provide only those applications 107 that are relevant or accessible to a user. Each user may then customize or configure Launchpad 103 by selecting a subset of the available applications 107 that are most relevant to the individual user, thus maximizing available screen real estate.

In an embodiment, as noted above, user interface 104 may include both big tiles 106 and small tiles 108. One of the differences between big tiles 106 and small tiles 108 is that big tiles 106 may include and display more information about an application 107 than small tiles 108. However, correspondingly big tiles 106 may take up more of the user interface 104 or display screen real estate than small tiles 108. Thus a user may decide which applications 107 are represented by big tiles 106 and small tiles 108 based on whatever applications and information are most relevant to the user. TILPS 102 may then provide Launchpad 103 based on the user's desired configuration.

In an embodiment, Launchpad 103 may include both a big tile section 110A and a small tile section 110B. Launchpad 103 may also include a link section 110C which may include links 112 that may be smaller visual indicators that may link or activate applications 107 when selected (but which may not provide additional data which may be provided via big tiles 106 or small tiles 108 as described in greater detail below). In an embodiment, a link 112 may be text only, or otherwise limited in how much information may be displayed. By limiting the type and/or amount of information available via links 112, TILPS 102 may reduce or minimize the required screen real estate necessary to display links 112 and increase or maximize the display area of user interface 104. By providing different sizes of visual indicators (big tiles 106, small tiles 108, links 112), TILPS 102 efficiently utilizes the available user interface 104 display area by providing the most relevant data and information to the user and enabling information to be displayed that may otherwise not be displayable were a single icon size to be used across all the different applications.

Three example big tiles 106A, 106B, and 106C are shown in big tile section 110A of the example of FIG. 1. Each big tile 106 includes a title 114. Title 114 may be a name or short descriptor as to what application 107 is associated or linked with a particular tile. Title 114 may be the actual name of the application as received from the application 107 (or metadata), or may be provided by user to describe the application 107. For example, an application may be called the Time Entry and Tracking System, but a user may provide a title 114 such as "Time Card."

Big tiles 106 may also include additional information 116 that may be displayed via Launchpad 103. Additional information 116 may include any information that is relevant to a user accessing the system and may be provided by the associated application. Examples of additional information 116 include charts, pictures/icons, screen shots, application or data state information, descriptions, counters, and regional information. Other embodiments may include any different type of information that may be displayed in big tiles 106. Other examples of additional information 116 are provided in FIG. 3, as discussed below.

Each big tile 106 may be rendered by TILPS 102 based on a big tile configuration 118. Big tile config 118 may allow a user to decide which information is to be displayed in a big tile 106 for an application or group of applications 107. For example, a particular application 107 may have metadata that indicates which information or data is available for display via Launchpad 103. Then, for example, a user or system administrator may select or customize which data or information is actually displayed across one or more tiles 106, 108 corresponding to the application 107. The various choices of information may include title 114, charts 116A, pictures 116B, description 116C, counters 116D, regional information 116E or any other information.

Big tile config 118 may be used on a per-application, per-tile, and/or per-device basis, or may be applied to a group of applications 107. In an embodiment, a user may select several different applications and customize big tile config 118 to be applied to each application 107 of the group. For example, each big tile 106 of a particular group of applications 107 may include the application title 114 and a counter 116D relevant to each individual application 107. Or, for example, different applications 107 may be grouped based on a particular user's or a group of users' different roles.

In an embodiment, an application 107 may track stock market investments. Via big tile configuration 118, a user may configure the stock tracker to display the prices of one or two selected stocks from the portfolio (e.g., such as the big movers for the day, the stocks that comprise the greatest portion of the portfolio, the smallest cap stocks, etc.). Or, for example, big tile configuration 118 may indicate that a performance chart 116A that tracks or displays the performance of the portfolio over the previous week or month or other time period.

In an embodiment, the stock market application 107 may be represented by two tiles 106, a first big tile 106 corresponding to a first portfolio or investment and a second big tile 106 (or one or more small tiles 108) corresponding to a second portfolio or investment. Then, for example, if a user selects a particular tile 106, 108 the data in the corresponding tile 106 may be updated (or may be continually updated in real-time), or the application may launch directly to the corresponding investment or portfolio so that the user may take whatever actions (e.g., trades) that the user desires.

In an embodiment, a big tile 106 may provide certain functionality (e.g., such as buy or sell shares of an investment) directly from Launchpad 103. For example, a particular big tile 106 may represent a particular investment. Then, for example, a user may select buy/sell and enter a number of shares directly into big tile 106. This information may then be passed to backend system 109 to perform the desired function via application 107.

In another example, if an application 107 performs functions with regard to sales, then the big tile 106 may include information about the best/worst performing sales regions, or a map of which sales areas are covered. In different embodiments, different users may select different information to be displayed via big tiles 106.

Similarly, TILPS 102 may use small tile configuration 120 to determine which information is to be displayed with respect to each of the various small tiles 108. Small tiles 108 may include any information that may be included in big tiles 106. However, the display area or amount of information that is available to small tiles 108 may be less than that of big tiles 106. Thus, either less information may be displayed in small tiles 108, or the information provided must be smaller (e.g., smaller text). However, beyond a certain point the text may be unreadable at which point the amount of information may be limited. In an embodiment, based on size of user interface 104 or display device, TILPS 102 may determine a maximum amount of information (or another amount less than the maximum) that may be displayed via big tiles 106, small tiles 108, and links 112.

TILPS 102 may also include a link configuration 122. Link configuration 122 may indicate which information is to be included in or as a link 112. Link configuration 122 may indicate what action 124 happens when the link is clicked (e.g., which page or screen of the application is loaded), and what text is used to represent the link on user interface 104. Links 112 may use even less space or otherwise be more limited in the types of information available than small tiles 108.

By providing various tile-types or sections 110A, 110B, 110C, TILPS 102 allows Launchpad 103 to be customized and increases (or even maximizes) the available user interface 104 area. This customization may be done on a per-user, per user-group, and/or per-device basis. In an embodiment, different applications 107 may not all provide valuable enough data or other functionality to justify the corresponding space required by big tiles 106. Thus, based on the available application 107 data and user preferences, Launchpad 103 may provide different sized display items (106, 108, 112).

For example, as shown in FIG. 1, in some embodiments, only three big tiles 106 may be able to fit on user interface in a particular row. However, in the same screen width (and with a reduced height), four small tiles 108 may fit. Further, twelve links 112 may fit in similar display area. The examples shown are merely exemplary, and in different embodiments, or across different screen sizes, different numbers of display items (106, 108, and 112) may be displayed.

Links 112 may be used for applications which are of lower priority, used less often, or that may not have data available so as to justify the use of extra screen space required for a big tile 106 or small 108. For example, certain older or legacy or transactional applications may not have data or information that is accessible via. Launchpad 103. As such, those applications 107 may be represented by links 112.

The division of Launchpad 103 into discrete sections 110A, 110B, and 110C based on the size or amount of information as shown is exemplary only. In an embodiment, a first (topmost or leftmost) section of Launchpad 103 may include tiles 106, 108 and/or links 112 that a particular user uses most often, or that correspond to a particular ongoing project on which the user is working.

For different applications 107, which may be of equal importance to a user, TILPS 102 may allow the user to configure how much information is immediately accessible via Launchpad 103 based on what's available via the application 107 and/or helpful or relevant to the user. As such, a first section 110A may include a combination of big tiles 106, small tiles 108, and links 112 which may be arranged in such a way as to maximize the available user interface 104 display area. Tile or application grouping may also be performed in a nested, stacked, or hierarchical manner.

In an embodiment, TILPS 102 may allow a user to simply drag and drop tiles 106, 108 and links 112 to different sections 110A-C of user interface 104 to change what information and how that information is displayed on user interface 104. Or, for example, a user may select from a menu option (e.g., right-click function) how much information or which information the user wants displayed about a particular application (e.g., big tile config 118, small tile config 120, or link config 122).

In an embodiment, TILPS 102 may receive a selection 123 of a particular display item (106, 108, or 112) from Launchpad 103. Selection 123 may indicate an intent to move the item or change the amount of type of information that is being displayed. In an embodiment, selection 123 may be a drag command (followed by a drop confirmation) between different sections 110A, 110B, 110C. Upon receiving the drop command, TILPS 102 may display the corresponding display item in accordance to the parameters provided in the corresponding configuration 118, 120, 122.

The configurations 118, 120, 122 may also indicate what action 124 is to be performed upon a selection (e.g., mouse click or other selection) of the display items. Different actions 124 may include updating or changing the displayed content or information, or launching the underlying application 107.

Figure 2:
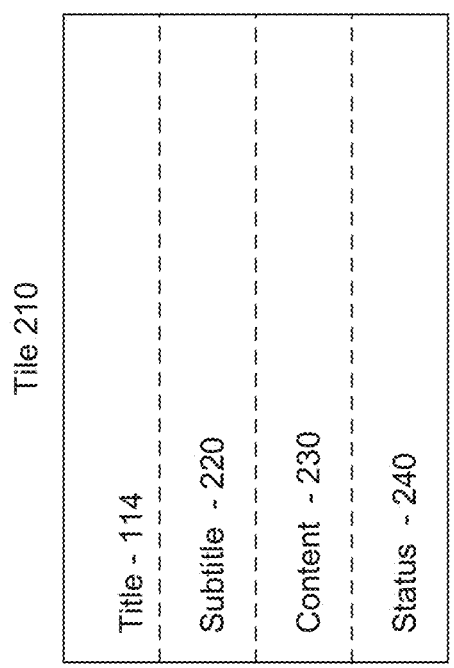
FIG. 2 is an example structure of a tile, according to some embodiments.

FIG. 2 is an example structure of a tile 210, according to an embodiment. Depending on whether the tile 210 is a big tile 106, or a small tile 108, the amount of information that can be displayed in the tile 210 may vary. In an embodiment, big tiles 106 may be of a first uniform size and small tiles 108 may be of a second uniform size.

In another embodiment, different big tiles 106 may vary in size from one another depending on which information is selected for display. However, the size may be limited by a minimum size (e.g., that is greater than or equal to a maximum small tile 108 size) and/or a maximum size (e.g., to ensure no one tile consumes too much user interface 104 screen real estate). Similarly, small tiles 108 may be capped on how large they can be (e.g., so that they are smaller than the smallest allowable big tile 106) and how small they can be (e.g., ensuring they are distinguishable from links). Then, for example, based on which information the user selects for big tile config 118 or small tile config 120 the tiles may be presented within their allowable ranges.

Tile 210 is an example structure of how a big tile 106 and/or small tile 108 may be presented or displayed in Launchpad 103. Title 114 may be a name (user or application provided) or other descriptor that identifies the application 107. In an embodiment, title 114 may be an icon, picture, or symbol that represents an application 107 or functionality.

Subtitle 220 may be a short descriptor that further describes the functionality or data represented by the tile 210. For example, if a particular tile 210 includes a past state a sales number for a previous span of time (such as sales for March 2016), then subtitle may indicate the span of time, giving context to the data. Or, for example, subtitle 220 may provide information as to which functionality the tile 220 links (e.g., calculator, time entry, client contact information, etc.).

Content 230 may include data retrieved from or functionality that may be performed the application 107 that may be relevant to a user. For example, if the tile 210 represents a sports application, content 230 may include the score of a particular game (e.g., which may be ongoing and updated in real-time, may have been previously played, or may be upcoming and thus may indicate the start time and location). The functionality, may include, for example, a request to update the score. In an embodiment, a user may decide which content (if any) the user wants displayed in tile 210 and the form in which the content is displayed (e.g., text, picture, chart, etc.).

Status 240 may be a status of the application 107, the performance of a function, or data. Status 240 may indicate whether an application 107 or data is accessible, is being updated, or whether the machine or backend 109 is down or unreachable. In an embodiment, status 240 may indicate to a user whether a particular action is required. For example, status 240 may indicate that a user needs to provide information to the system or take a particular action (e.g., such as contact a particular client).

In an embodiment, status 240 may indicate that a particular event has occurred or scheduled to occur at a particular time. For example, status 240 may indicate that a product has reached a certain price, a sales order has been received, or a sale is set to take place at 3:00 pm. In an embodiment, status 240 may be displayed differently based on a priority of the status 240. For example, urgent or important status items may be enlarged or displayed in red, bold, or flashing, while less urgent items may be displayed in amber or green or of regular size.

In an embodiment, a user may be operating a particular application 107 and may choose to save the state of the application in a tile 106, 108. Then, for example, content 230 may indicate a state of the application or data when it was saved, and status 240 may indicate when the data state was saved.

Figure 3B:

FIGS. 3A and 3B are block diagrams of example tiles 210 according to some embodiments. 310 is an example of a key performance indicator (KPI) that may be included in a tile 210. Tile 210 is used herein to refer to tiles generally and may refer to big tiles 106 and/or small tiles 108. KPI 310 may measure or monitor key performance metrics associated with or related to an application. In the example shown the profit margin of a particular region may be shown, and the tile may indicate whether the margin has increased or decreased. Showing such information may help provide the user with valuable or useful information and prevent the user from having to open up the application (unless necessary), thus saving time, memory, processing power, and/or computing cycles which may otherwise be consumed by a user activating the underlying application 107. Another example KPI 310 may include the price of a stock, performance of a portfolio, or the latest sales figures across one or more regions.

Tile 320 is an example of a comparison chart, which may be a comparison between different values. For example, comparison chart 320 may compare values across different objects, persons, organizations. Examples may include sales numbers across different teams of sales people or across different regions, or points scored by different players.

Tile 330 is an example of a bullet chart which may compare a single value to one or more target values. For example, bullet chart may compare an accumulated sales total to a sales goal or fundraising goal.

Tile 340 is an example of a trend chart which may include accumulated totals over time. For example, the trend chart 340 may include the performance of an employee, division, or sales of a product over time. In an embodiment, a particular division of an organization may offer multiple product lines and trend chart may capture a summary of how those products performed (e.g., sold) against one another, and how the division itself performed (e.g., with a cumulative total) over a specified period of time. In an embodiment, a selection of a tile may allow a user to adjust the period of time without specifically launching the underlying application 107 providing the data.

Tile 350 is an example of a bar chart that provides a visual comparison between different values. 360 is an example of a launch tile that identifies a resource that may be launched. For example, a launch tile may direct a user to a specific place to access data related to a task or function (such as a financial statement or travel expenses relative to the user). The may limit how much information may need to be loaded into memory, thus saving resources that may otherwise be consumed, and allow the user to more quickly perform the desired function (e.g., accessing or modifying data).

Tile 370 is an example of a monitoring tile. Monitoring tile 370 may monitor and provide status information regarding a pending action item, such a travel, vacation, or reimbursement approval request. Or, for example, monitoring tile 370 may provide real-time updates with regard to flight status, or stock price.

Any of the tiles 310-370 may be provided in a dynamic, static, or at-will manner. In a dynamic manner, certain information may be updated in real-time. For example, if there is high network bandwidth available (e.g., by a laptop or desktop connected to a network) then real-time data may be updated in tiles 310-370. However, if Launchpad 103 is being accessed from a mobile device or area of low bandwidth (e.g., relative to a particular threshold or user-setting), then the data may only be updated periodically or upon request (e.g., at-will via a pull command, for example). Other data provided via tiles 310-370 may include static data, such as data about a particular period in time or screenshot data. While other data may be provided in a hybrid, such that the data will update upon specific request or at-will of a user.

Though the tile information shown in 310-370 is shown as a single piece of information per-tile 210, in different embodiments, a particular tile 210 may include multiple types of tiles 310-370 (e.g., tile information). For example, a single big tile may include both KPI 310 and bullet chart 330 information. Or, for example, information provided in any particular tile 210 may periodically rotate. For example, a tile may toggle between displaying launch information 360 and monitoring information 370 every five seconds. These settings may be provided in big tile config 118 and small tile config 120.

Figure 4:
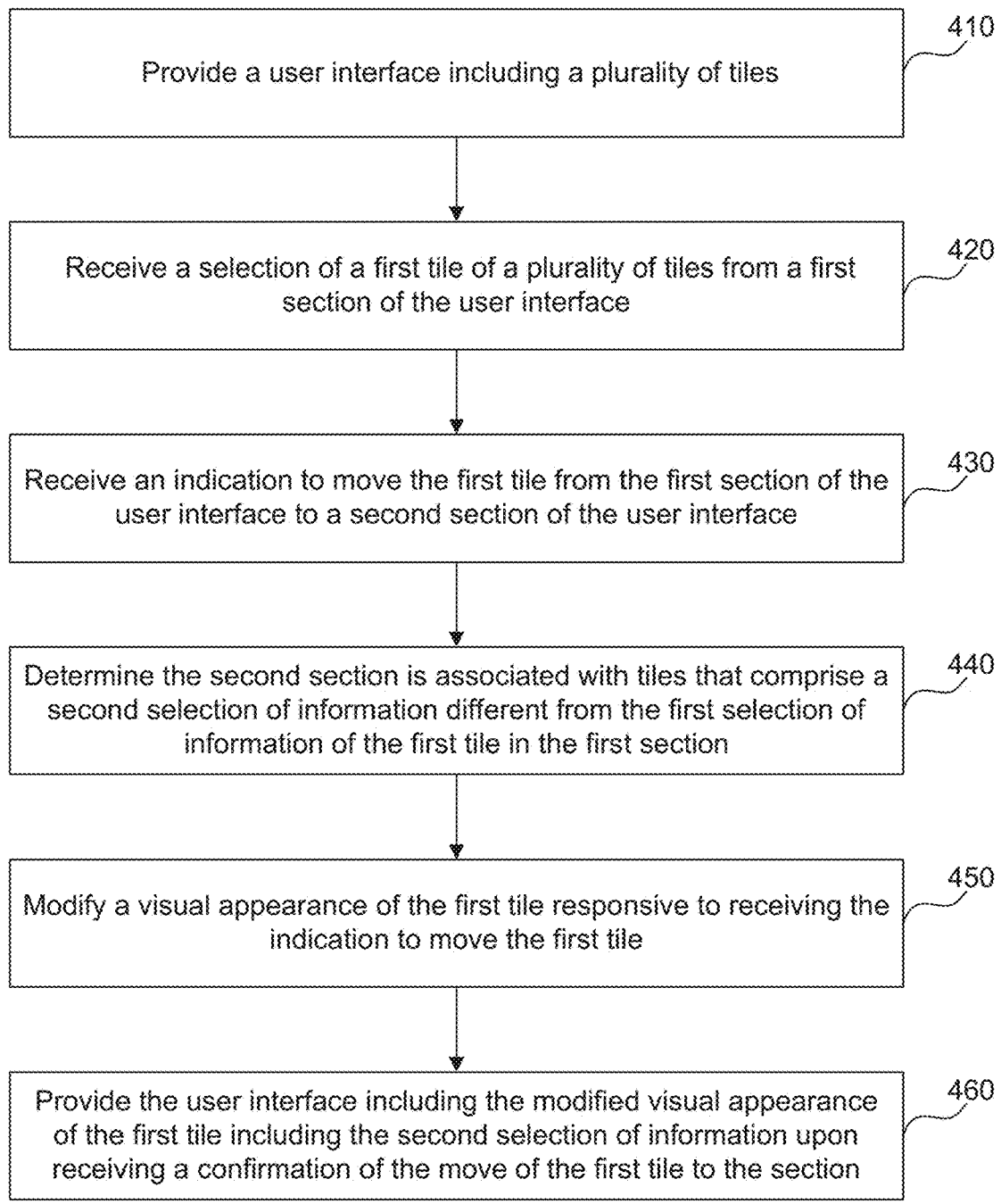
FIG. 4 is a flowchart illustrating a process for the execution of a tile interface and launch pad system, according to some embodiments.

FIG. 4 is a flowchart for a method 400 for a tile interface and Launchpad system, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

In 410, a user interface including a plurality of tiles may be provided. For example, TILPS 102 may provide Launchpad 103 via a user interface 104. User interface 104 may be the user interface or display area across any different number of devices. Launchpad 103 may include big tiles 106, small tiles 108, and links 112 that correspond to different applications 107 operating across one or more backend systems 109.

In 420, a selection of a first tile of a plurality of tiles from a first section of the user interface is received. TILPS 102 may receive selection 123 from a user interacting with Launchpad 103. For example, selection 123 may indicate a drag operation on tile 108D that is configured based on small tile config 120.

In 430, an indication to move the first tile from the first section of the user interface to a second section of the user interface is received. In continuing the example above, the user may drag selected tile 108D to big tile section 110A.

In 440, it may be determined that the second section is associated with tiles that comprise a second selection of information different from the first selection of information of the first tile in the first section. For example, TILPS 102 may compare big tile config 118 to small tile config 120 to determine how the visual appearance of a display item changes between big tile section 110A and small tile section 110B. This may also affect how other items are displayed on Launchpad 103. For example, moving an item from small tile section 110B to big tile section 110A may consume greater display screen space than vice versa, and thus fewer items may be displayed on the screen or the existing items may be reconfigured to account for the new big tile 106.

In 450, a visual appearance of the first tile is modified responsive to receiving the indication to move the first tile. For example, upon the drag operation, the user may be provided with a preview of what information or how tile 108D would be displayed as a big tile 106 based on big tile config 118. On the drop or change appearance command, the display item may be displayed with the new properties as indicated by the corresponding configuration file 118, 120, 122.

In 460, the user interface including the modified visual appearance of the first tile including the second selection of information may be provided upon receiving a confirmation of the move of the first tile to the section. For example, Launchpad 103 may be displayed with the display items rearranged to account for the increase/decrease of display space consumed by the moved display item (e.g., tile 106, 108, or link 112).

Figure 5:
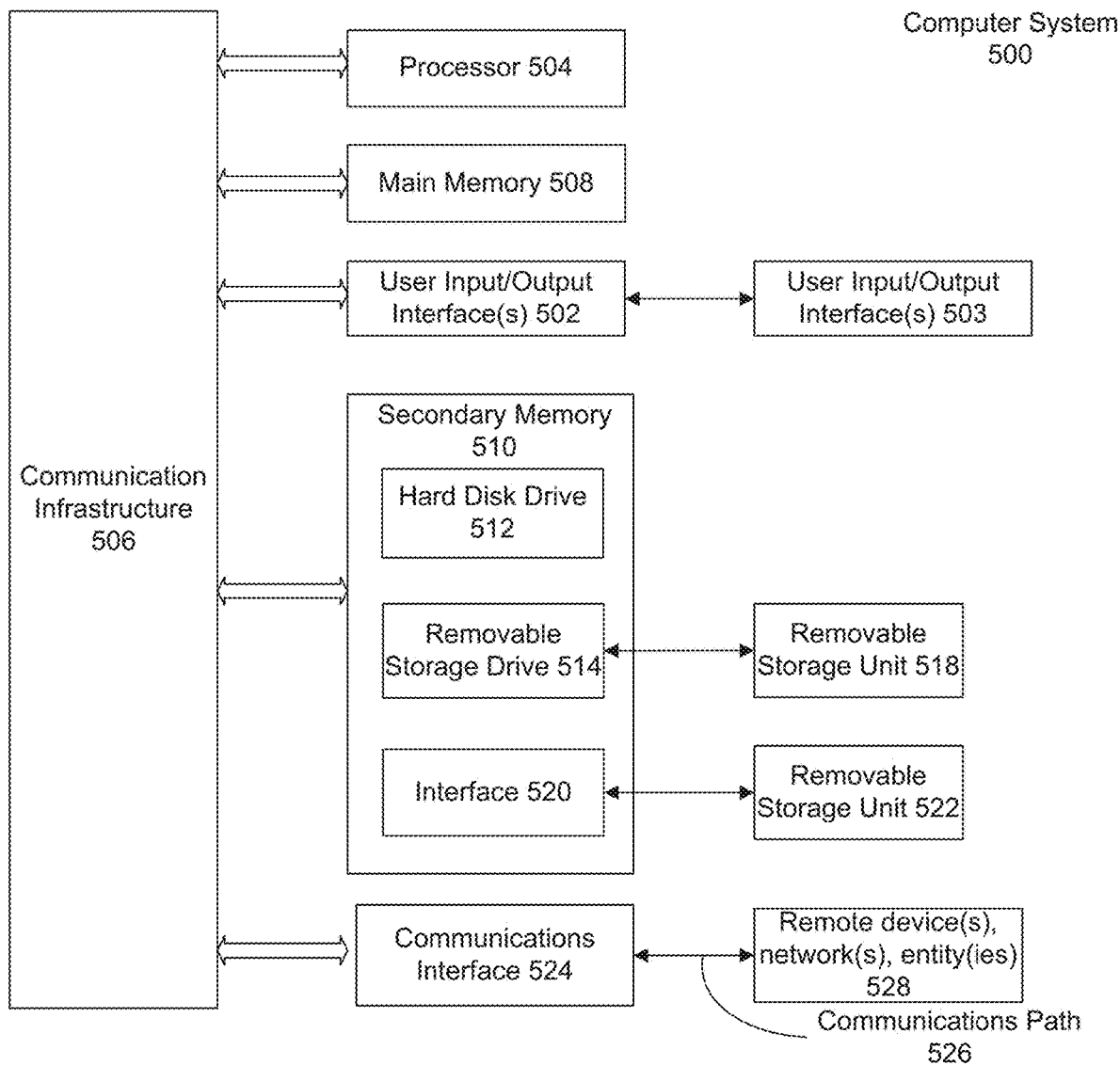
FIG. 5 is an example computer system useful for implementing various embodiments.

Various embodiments can be implemented, for example, using one or more computer systems, such as computer system 500 shown in FIG. 5. Computer system 500 can be used, for example, to implement the user interface 104 of FIG. 1 and/or the method 400 of FIG. 4. For example, computer system 500 can dynamically modify Launchpad 103 based on user selections 123. The dynamic movement of display items between different forms (106, 108, 112) or sections (110A, 110B, 110C) may also trigger and update of data that is displayed in the corresponding item or tile 106, 108. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518.

Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   providing, by a processor, a user interface comprising a plurality of tiles, wherein each tile of the plurality of tiles corresponds to one of a plurality of applications;
   determining that the user interface comprises a first section including both a first tile and a second tile corresponding to a same user account of a first application of the plurality of applications, wherein the first tile includes information from a first record of the user account, wherein the second tile includes information from both the first record and a second record of the user account, and wherein the first tile includes functionality that receives updated information about the first record from a user, and provides the updated information to the first application that updates the first record of the user account;
   receiving a first selection of the first tile from the first section of the user interface;
   requesting updated information associated with the first application corresponding to the first record;
   updating the first record as displayed in both the first tile and the second tile responsive to receiving the requested updated information;
   receiving an indication to move the first tile from the first section of the user interface to a second section of the user interface;
   determining that the second section is associated with tiles that comprise a second selection of information different from the first selection of information;
   modifying, by the processor, a visual appearance of the first tile, responsive to receiving the indication to move the first tile, from displaying the first selection of information associated with the first application to displaying the second selection of information associated with the first application; and
   providing, by the processor, the user interface including the modified visual appearance of the first tile including the second selection of information and the updated information upon receiving a confirmation of the move of the first tile to the second section.

2. The method of claim 1, wherein the indication to move comprises a drag indication of the first tile from the first section, and the confirmation comprises a drop indication of the first tile onto the second section of the user interface.

3. The method of claim 1, wherein the first selection of information comprises a title of the first application and one or more pieces of additional information, the additional information comprising: regional information, a counter relevant to the first application, or a chart of data associated with the first application.

4. The method of claim 3, wherein the second selection comprises the title and less additional information than provided in the first selection.

5. The method of claim 4, wherein the user interface comprises a link area comprising one or more links to applications that do not have any of the additional information.

6. The method of claim 1, further comprising:
   receiving an activation of the first tile; and
   launching the first application responsive to the activation.

7. The method of claim 6, wherein the user interface comprises a launch pad to a backend system comprising one or more processors, wherein the backend system is remote from a device comprising the user interface, and wherein the launching comprises activating the first application on the backend system.

8. The method of claim 1, wherein the requesting comprises:
   requesting the updated information from the first application responsive to the received indication to move the first tile from the first section of the user interface to the second section of the user interface; and
receiving the updated information from the first application.

9. The method of claim 1, wherein the user interface comprises a role-based grouping of the plurality of tiles, wherein the tiles of the role-based grouping correspond to a role of a user accessing the user interface.

10. The method of claim 1, wherein both the first tile and a second tile are simultaneously displayed in the user interface correspond to the first application, wherein each tile is associated with different underlying data received from the first application.

11. The method of claim 1, further comprising:
determining an available bandwidth to receive updated information from the first application; and
adjusting a frequency as to how often updated information is requested from the first application based on the determined available bandwidth.

12. The method of claim 1, wherein the second tile includes functionality that enables the second record of the application to be updated directly from the second tile displayed in the user interface.

13. The method of claim 1, wherein information displayed in at least one of the first tile or the second tiles is updated based on data received from a source other than the user.

14. The method of claim 1, wherein the information of the first record is structured as at least a first data point and a second data point, wherein the information of the second record is structured as at least the first data point and the second data point, wherein the first tile displays the information for both the first data point and the second point, and wherein both the first tile and the second tile include identical functionality that is executable with regard to the first data from the first tile or the second data from the second tile.

15. A system, comprising:
a memory; and
at least one processor coupled to the memory and configured to:
provide a user interface comprising a plurality of tiles, wherein each tile of the plurality of tiles corresponds to one of a plurality of applications;
determine that the user interface comprises a first section including both a first tile and a second tile corresponding to a same user account of a first application of the plurality of applications, wherein the first tile includes information from a first record of the user account, wherein the second tile includes information from both the first record and a second record of the user account, and wherein the first tile includes functionality that receives updated information about the first record from a user, and provides the updated information to the first application that updates the first record of the user account;
receive a first selection of the first tile from the first section of the user interface;
request updated information associated with the first application corresponding to the first record;
update the first record as displayed in both the first tile and the second tile responsive to receiving the requested updated information;
receive an indication to move the first tile from the first section of the user interface to a second section of the user interface;
determine that the second section is associated with tiles that comprise a second selection of information different from the first selection of information;
modify a visual appearance of the first tile, responsive to receiving the indication to move the first tile, from displaying the first selection of information associated with the first application to displaying the second selection of information associated with the first application; and
provide the user interface including the modified visual appearance of the first tile including the second selection of information and the updated information upon receiving a confirmation of the move of the first tile to the second section.

16. The system of claim 15, wherein the indication to move comprises a drag indication of the first tile from the first section, and the confirmation comprises a drop indication of the first tile onto the second section of the user interface.

17. The system of claim 15, wherein the first selection of information comprises a title of the first application and one or more pieces of additional information, the additional information comprising: regional information, a counter relevant to the first application, or a chart of data associated with the first application.

18. The system of claim 17, wherein the second selection comprises the title and less additional information than provided in the first selection.

19. The system of claim 15, wherein the at least one processor is configured to:
request the updated information from the first application responsive to the received indication to move the first tile from the first section of the user interface to the second section of the user interface; and
receive the updated information about the first application.

20. A non-transitory computer-readable medium having instructions stored thereon that, when executed by at least one computing device, causes the at least one computing device to perform operations comprising:
providing a user interface comprising a plurality of tiles, wherein each tile of the plurality of tiles corresponds to one of a plurality of applications;
determining that the user interface comprises a first section including both a first tile and a second tile corresponding to a same user account of a first application of the plurality of applications, wherein the first tile includes information from a first record of the user account, wherein the second tile includes information from both the first record and a second record of the user account, and wherein the first tile includes functionality that receives updated information about the first record from a user, and provides the updated information to the first application that updates the first record of the user account;
receiving a first selection of the first tile from the first section of the user interface;
requesting updated information associated with the first application corresponding to the first record;
updating the first record as displayed in both the first tile and the second tile responsive to receiving the requested updated information;
receiving an indication to move the first tile from the first section of the user interface to a second section of the user interface;

determining that the second section is associated with tiles that comprise a second selection of information different from the first selection of information;

modifying a visual appearance of the first tile, responsive to receiving the indication to move the first tile, from displaying the first selection of information associated with the first application to displaying the second selection of information associated with the first application; and providing the user interface including the modified visual appearance of the first tile including the second selection of information and the updated information upon receiving a confirmation of the move of the first tile to the second section.

* * * * *